United States Patent [19]

Asai et al.

[11] Patent Number: 4,740,419
[45] Date of Patent: Apr. 26, 1988

[54] MAGNETIC RECORDING MEDIA

[75] Inventors: Takamitsu Asai; Masaaki Fujiyama; Haruo Masuda, all of Kanagawa, Japan

[73] Assignee: Fuji Photo Film Co., Ltd., Kanagawa, Japan

[21] Appl. No.: 878,742

[22] Filed: Jun. 26, 1986

[30] Foreign Application Priority Data

Jun. 26, 1985 [JP] Japan .................................. 60-139872

[51] Int. Cl.$^4$ ............................................... G11B 5/70
[52] U.S. Cl. ..................................... 428/323; 428/694; 428/900
[58] Field of Search ...................... 428/694, 900, 323; 427/128

[56] References Cited

U.S. PATENT DOCUMENTS

| 4,425,401 | 1/1984 | Ido et al. | 428/694 |
| 4,511,617 | 4/1985 | Hideyama et al. | 427/131 |
| 4,565,726 | 1/1986 | Oguchi et al. | 428/694 |

Primary Examiner—Paul J. Thibodeau
Attorney, Agent, or Firm—Sughrue, Mion, Zinn, Macpeak & Seas

[57] ABSTRACT

A magnetic recording medium is described which has, on a non-magnetic support, a magnetic layer comprising a ferromagnetic substance dispersed in a binder, wherein the ferromagnetic substance is a hexagonal tabular ferromagnetic substance having an axis of easy magnetization in the direction perpendicular to the plain thereof and the ratio of the bulk density to true density (bulk densy/true density) is at least 0.16. The magnetic recording medium has improved output and C/N.

9 Claims, 1 Drawing Sheet

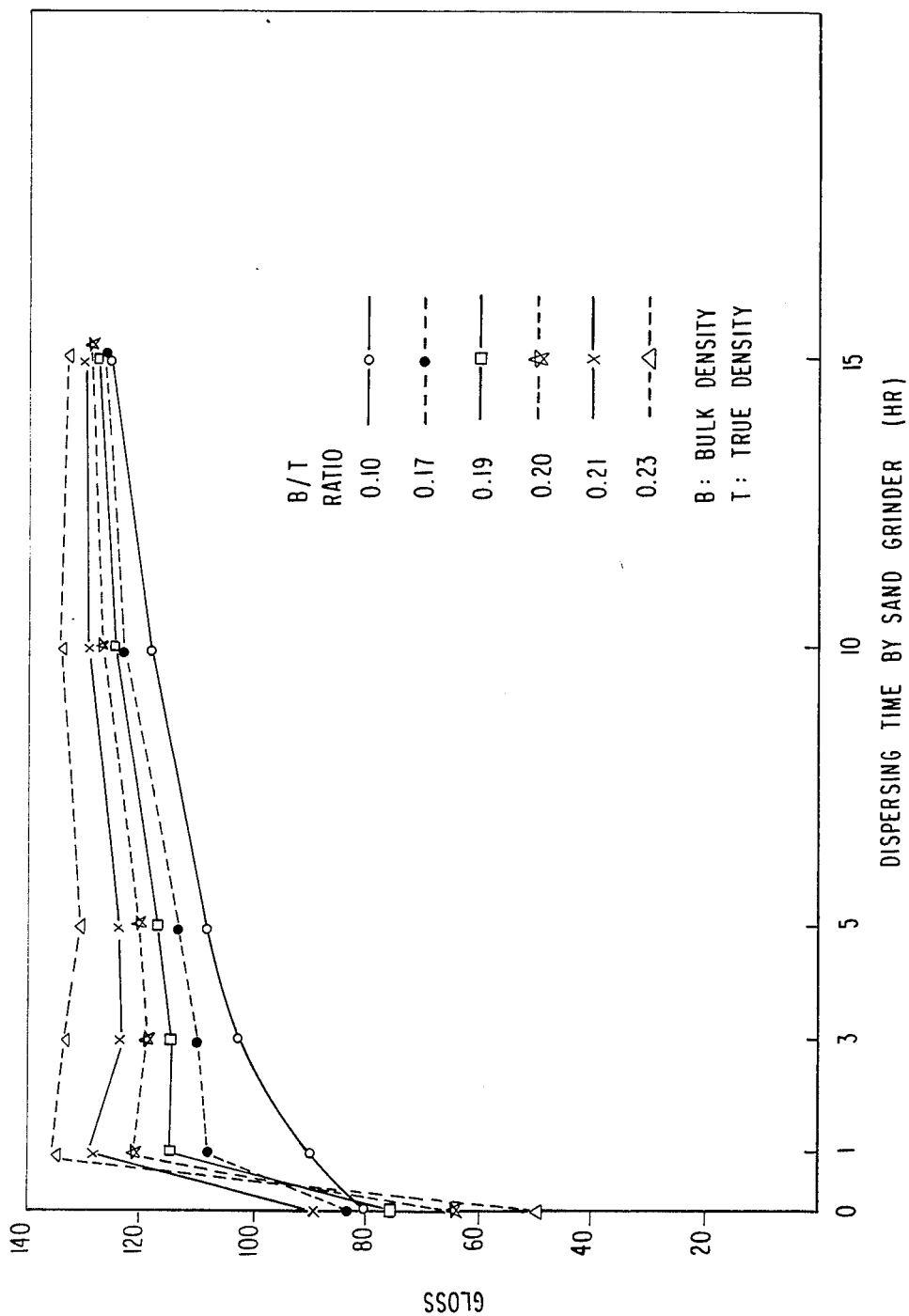

MAGNETIC RECORDING MEDIA

FIELD OF THE INVENTION

This invention relates to a magnetic recording medium having improved output and C/N. More particularly, the invention relates to a magnetic recording medium containing a hexagonal tabular ferromagnetic substance having an axis of easy magnetization in the direction perpendicular to the plane thereof and having greatly improved dispersibility by the application of a compression treatment.

BACKGROUND OF THE INVENTION

Hitherto, a magnetic recording medium prepared by coating on a non-magnetic support a coating composition composed of a ferromagnetic substance of an acicular form, such as $\gamma$-$Fe_2O_3$, $CrO_2$, etc., dispersed in a binder has been widely used for magnetic recording and reproduction.

However, recently, the improvement of recording density has been strongly desired for attaining a large capacity of recording and the miniaturization of recording devices and in order to obtain a magnetic recording medium suitable for high-density recording using a conventional acicular ferromagnetic powder, it is required to sufficiently reduce the maximum size of the acicular ferromagnetic powder far below the recording wavelength or the length of the recording bit. At present, an acicular magnetic powder having a size of about 0.3 $\mu$m has already been practically used and the minimum recording wavelength of about 1 $\mu$m has been obtained.

For obtaining a magnetic recording medium capable of performing far higher density recording, it is required to further reduce the size of an acicular magnetic powder. However, since in such a small-sized acicular magnetic powder, the diameter thereof becomes very fine as less than 100 Å and the volume of the particle becomes very small as less than $10^{-17}$ $cm^3$, there are problems in that the magnetic characteristics are reduced by heat disturbance and the surface effect and also a sufficient orientation is not obtained by the application of a magnetic field to the coated magnetic layer.

Recently, for eliminating the above-described disadvantages, a magnetic recording medium using a tubular hexagonal system ferrite having an axis of easy magnetization perpendicular to the plane thereof as the ferromagnetic substance has been developed (see, Japanese Patent Application (OPI) Nos. 6525/83, 6526/83, etc.). (The term "OPI" as used herein means an "unexamined published application".) However, since such a hexagonal ferrite is of tabular form and has an axis of easy magnetization perpendicular to the plane thereof, the ferrite shows high aggregating force among the particles, whereby it takes a long period of time to disperse the ferrite powder in a binder and also it is difficult to obtain a sufficient degree of dispersion. Furthermore, the output and C/N of the magnetic recording medium using such a hexagonal ferrite cannot be sufficiently improved owing to the above-described disadvantage.

SUMMARY OF THE INVENTION

Thus, as the result of various investigations on a tubular hexagonal ferrite, the inventors have discovered that the above-described disadvantages can be eliminated by increasing the bulk density of the ferromagnetic substance by the application of a compression treatment.

An object of this invention is, therefore, to provide a magnetic recording medium which can be prepared with a shortened dispersing time for the ferromagnetic powder and an improved degree of dispersion thereof and which has improved output and C/N.

That is, according to this invention, there is provided a magnetic recording medium having on a non-magnetic support a magnetic layer comprising a ferromagnetic substance dispersed in a binder, wherein said ferromagnetic substance is a hexagonal tabular ferromagnetic substance having an axis of easy magnetization in the direction perpendicular to the plane thereof and the ratio of the bulk density to the true density (bulky density/true density ratio) is at least 0.16.

BRIEF DESCRIPTION OF THE DRAWING

The FIGURE is a graph showing the relation between the dispersing time by a sand grinder and the gloss value about ferromagnetic substances each having a different value of the bulk density/true density ratio.

DESCRIPTION OF THE PREFERRED EMBODIMENT

The magnetic recording medium of this invention has the fundamental structure that a magnetic layer composed of a hexagonal tabular ferromagnetic substance dispersed in a binder is formed on a non-magnetic support.

Now, the invention is described below in detail.

There is no particular restriction on the non-magnetic support for use in this invention and any supports which are ordinarily used in the field of art can be used. Examples of these non-magnetic supports are films of synthetic resins such as polyethylene terephthalate, polyethylene, polypropylene, polycarbonate, polyethylene naphthalate, polyamide, polyamide-imide, polyimide, polysulfone, polyether sulfone, etc.; and metal foils such as aluminum foils, stainless steel foils, etc. The thickness of the non-magnetic support is generally from 3 to 5 $\mu$m and preferably from 5 to 30 $\mu$m.

As the hexagonal tabular ferromagnetic substance having an axis of easy magnetization in the direction penpendicular to the plane thereof for use in this invention, there are substitution products of hexagonal ferrites, such as barium ferrite, strontium ferrite, lead ferrite, calcium ferrite, etc., as well as a manganese-bismuth alloy, a hexagonal cobalt alloy, etc. Particularly preferred ferrites for use in this invention are Co-substitution products of each of barrium ferrites and strontium ferrites. The plane diameter (mean particle size) of the hexagonal tabular ferromagnetic substance for use in this invention is from 0.01 to 0.10 $\mu$m and preferably from 0.03 to 0.10 $\mu$m, and the thickness of the ferromagnetic substance (mean thickness) is from 0.005 to 5 $\mu$m and preferably from 0.015 to 0.05 $\mu$m.

It has also been discovered in this invention that when a compression treatment is applied to a hexagonal tabular ferromagnetic substance in such a manner that the ratio of the bulk density to the true density (i.e., bulk density/true density ratio) becomes at least 0.16 and preferably from 0.67 to 0.16, the dispersibility of the ferromagnetic substance in a binder can be greatly improved in a very short period of time to thereby improve the output and C/N of the magnetic recording medium using such a ferromagnetic substance.

For example, the true density of Co-substituted barium ferrite is 5.27 and the bulk density thereof without the application of a compression treatment as in this invention is ordinarily in the range of from 0.20 to 0.60. By the application of the compression treatment to the ferromagnetic substance according to this invention, the bulk density thereof is increased and the increase of the bulk density becomes remarkable with the increase of the pressure for the compression treatment and the treatment period of time.

In this invention, it is more preferred that the above-described ratio of the bulk density to the true density of the ferromagnetic substance is in the range of from 0.20 to 0.50. If the ratio is less than 0.16, it takes a long period of time to disperse the ferromagnetic substance in the binder as well as the dispersed extent of the ferromagnetic substance in a binder becomes insufficient, which results in reducing the recording and reproducing output and also C/N of the magnetic recording medium using the ferromagnetic substance. On the other hand, if the bulk density thereof is too high, such as near the true density thereof, the hexagonal tabular ferromagnetic substance particles are liable to be deformed or damaged although the extent of damage may be less than in the case of using conventional $\gamma$-$Fe_2O_3$ acicular ferromagnetic particles.

The compression treatment for the hexagonal ferromagnetic substance in this invention can be performed by, for example, a sand mill MSPU-type apparatus made by Matsumoto Chuzo Tekko Sho K.K. Since the amount of the ferromagnetic substance which can be treated by this type of apparatus in one treatment is 30 to 100 kg, by placing the ferromagnetic substance of the amount in the aforesaid range in the apparatus and setting up a desired pressure and treatment time, the compression treatment can be performed at the desired pressure and for the desired treatment time.

The treatment pressure is from 5 to 150 kg/cm and preferably from 10 to 120 kg/cm, and the treatment time is from 5 minutes to 10 hours and preferably from 10 minutes to 5 hours.

The magnetic layer in this invention contains a binder and, if desired, other additives in addition to the above-described ferromagnetic substance. Examples of such additives are dispersing agents, lubricants, abrasives, antistatic agents, etc.

As the binder for use in this invention, there are conventionally known thermoplastic resins, thermosetting resins, reactive resins, and mixtures thereof.

The thermoplastic resins for use in this invention have a softening temperature of 150° C. or lower, a mean molecular weight of from 10,000 to 200,000, and a polymerization degree of from about 200 to 2,000. Examples the thermoplastic resins are a vinyl chloride-vinyl acetate copolymer, a vinyl chloride-vinyl acetate-maleic acid copolymer, a vinyl chloride-vinylidene chloride copolymer, a vinyl chloride-acrylonitrile copolymer, an acrylic acid ester-acrylonitrile copolymer, an acrylic acid ester-vinylidene chloride copolymer, an acrylic acid ester-styrene copolymer, a methacrylic acid ester-acrylonitrile copolymer, a methacrylic acid ester-vinylidene chloride copolymer, a methacrylic acid ester-styrene copolymer, a urethane elastomer, polyvinyl fluoride, a vinylidene chloride-acrylonitrile copolymer, a butadiene-acrylonitrile copolymer, a polyamide resin, polyvinyl butyral, cellulose derivatives (e.g., cellulose acetate butyrate, cellulose diacetate, cellulose triacetate, cellulose propionate, nitrocellulose, etc.), a styrene-butadiene copolymer, a polyester resin, various synthetic rubber-based thermoplastic resins (e.g., polybutadiene, polychloroprene, polyisoprene, a styrene-butadiene copolymer, etc.), and mixtures thereof.

The molecular weight of the thermosetting resin or the reactive resin for use in this invention is 200,000 or less in the state of the coating composition thereof but the molecular weight is increased by causing a condensation reaction, an addition reaction, etc., by heating the layer after coating and drying the coating composition containing the resin. Of these resins, resins which do not cause softening or melting during heating are preferred. Specific examples of these resins are a phenol-formalin-novolak resin, a phenol-formalin-cresol resin, a phenol-furfural resin, a xylene-formaldehyde resin, a urea resin, a melamine resin, a drying oil-denatured alkyd resin, a carbolic acid resin-denatured alkyd resin, a maleic acid resin-denatured alkyd resin, an unsaturated polyester resin, a mixture of an epoxy resin and a hardening agent (e.g., polyamine, an acid anhydride, a polyamide resin, etc.), an isocyanato-terminated polyester humidity-hardening type resin, an isocyanato-terminated polyether humidity-hardening type resin, a polyisocyanate prepolymer (e.g., a compound containing 3 or more isocyanato groups in one molecule obtained by the reaction of a diisocyanate and a low molecular weight triol, and a trimer or tetramer of a diisocyanate), a resin having a polyisocyanate prepolymer and active hydrogen (e.g., a polyester polyol, a polyether polyol, an acrylic acid copolymer, a 2-hydroxyethyl methacrylate copolymer, a maleic acid copolymer, a p-hydroxystyrene copolymer, etc.), and mixtures thereof.

In the above-described binders, vinyl chloride-vinyl acetate-maleic acid copolymers give the best results in the combination of the ferromagnetic substance in this invention.

The above-described binders may be used alone or in combination, and other additives can be added thereto. The mixing ratio of the binder to the ferromagnetic substance in this invention is from 8 to 400 parts by weight and preferably from 10 to 200 parts by weight per 100 parts by weight of the ferromagnetic substance.

Examples of the dispersing agent (pigment humectant) for use in this invention are fatty acids having from 12 to 18 carbon atoms (represented by $R_1COOH$, wherein $R_1$ represents an alkyl or alkenyl group having from 11 to 17 carbon atoms) such as caprylic acid, capric acid, lauric acid, myristic acid, palmitic acid, stearic acid, oleic acid, elaidic acid, linolic acid, linolenic acid, stearolic acid, etc.; metal soaps composed of salts of alkali metals (e.g., Li, Na, K, etc.) or alkaline earth metals (e.g., Mg, Ca, Ba, etc.) of the above-described fatty acids; fluorine-containing compounds of esters of the above-described fatty acids; amides of the above-described fatty acids; polyalkylene oxide alkylphosphoric acid esters; lecithin; trialkylpolyolefinoxy quaternary ammonium salts (wherein the alkyl has from 1 to 5 carbon atoms and the olefin is ethylene, propylene, etc.), etc. Other examples of the dispersing agent are higher alcohols having at least 12 carbon atoms and sulfuric acid esters. The amount of the dispersing agent used is in the range of from 0.5 to 20 parts by weight per 100 parts by weight of the above-described binder.

Examples of the lubricants for use in the invention are solicone oils such as dialkylpolysiloxanes (wherein the alkyl has from 1 to 5 carbon atoms), dialkoxypolysiloxanes (wherein the alkoxy has from 1 to 4 carbon atoms), monoalkylmonoalkoxypolysiloxanes (wherein the alkyl has from 1 to 5 carbon atoms, and the alkoxy has from 1 to 4 carbon atoms), phenylpolysiloxanes, fluoro-alkyl-polysiloxanes (wherein the alkyl has from 1 to 5 carbon atoms), etc.; fine powders of electrically conductive materials such as graphite, etc.; fine powders of inorganic compounds such as molybdenum disulfide, tungsten disulfide, etc.; fine particles of plastics such as polyethylene, polypropylene, a polyethylene-vinyl chloride copolymer, polytetrafluoroethylene, etc.; α-olefin polymers; unsaturated aliphatic hydrocarbons which are in a liquid state at normal temperature (compounds having n-olefin double bonds bonded to the terminal carbons and the carbon atom number being about 20); fatty acid esters composed of a monobasic fatty acid having from 1 to 20 carbon atoms and a monohydric alcohol having from 3 to 12 carbon atoms; fluorocarbons, etc. The amount of the lubricant used is in the range of from 0.2 to 20 parts by weight per 100 parts by weight of the binder.

Examples of the abrasives are fused almina, silicon carbide, chromium oxide ($Cr_2O_2$), corundum, artificial corundum, diamond, artificial diamond, garnet, emery (main components: corundum and magnetite), etc. These abrasives have a Mohs' hardness of at least 5 and a mean particle diameter of from 0.05 to 5 μm and preferably from 0.1 to 2 μm. The amount of the abrasive used is in the range of from 0.5 to 20 parts by weight per 100 parts by weight of the binder.

Examples of the antistatic agent for use in this invention are fine powders of electrically conductive materials such as carbon black, carbon black graft polymers, etc.; natural surface active agents such as saponin; nonionic surface active agents such as alkylene oxide-based ones, glycerol-based ones, glycidol-based ones, etc.; cationic surface active agents such as higher alkylamines, quaternary ammonium salts, heterocyclic compounds (e.g., pyridine, etc.), phosphoniums, sulfoniums, etc.; anionic surface active agents containing an acid group such as a carboxylic acid group, a sulfonic acid group, a phosphoric acid group, a sulfuric acid ester group, a phosphoric acid ester group, etc.; and amphoteric surface active agents such as amino acids, aminosulfonic acids, sulfuric acid or phosphoric acid esters of amino alcohol, etc. The amount of the electrically conductive fine powder used is in the range of from 0.2 to 20 parts by weight per 100 parts by weight of the binder, and the amount of the surface active agent used is in the range of from 0.1 to 10 parts by weight per 100 parts by weight of the binder.

These surface active agents may be used alone or in admixture. These surface active agents are used as an antistatic agent but, as the case may be, are also used for improving dispersibility of the ferromagnetic substance, the magnetic characteristics of the magnetic recording medium, and the lubricating property and also as a coating aid.

The magnetic layer in this invention is formed by kneading the ferromagnetic substance with the above-described binder, various additives, a solvent, etc., to provide a magnetic coating composition and coating the coating composition on a non-magnetic support, followed by orientation and drying.

At kneading, the ferromagnetic substance and above-described components are supplied simultaneously or successively into a kneader. For example, the magnetic coating composition may be prepared by adding the ferromagnetic substance to a solvent containing a binder and a dispersing agent and kneading the mixture for a definite period of time.

At kneading of the magnetic coating composition, various kinds of kneaders can be used. For example, there are a two-roll mill, a three-roll mill, a ball mill, a pebble mill, a trommell, a sand grinder, a Szegvari attritor, a high-speed impeller dispersing device, a high-speed stone mill, a high-speed impact mill, a disperser, a kneader, a high-speed mixer, a homogenizer, a supersonic dispersing device, etc.

The techniques of kneading are described in T. C. Patton, *Fluidity of Coating Materials and Pigment Dispersion* (published by Kyoritsu Shuppan K.K., 1975) and also U.S. Pat. Nos. 2,581,414 and 2,855,156.

As the method of coating the above-described magnetic coating composition on a support, there is air doctor coating, blade coating, rod coating, extrusion coating, air knife coating, squeeze coating, impregnation coating, reverse roll coating, transfer roll coating, gravure coating, kiss coating, cast coating, spray coating, spin coating, etc. These methods are practically described in *Coating Engineering*, pages 253–277, published by Asakura Shoten, Mar. 20, 1971.

The magnetic recording medium of this invention may have two or more layers including the above-described magnetic layer and in this case these layers are formed continuously on a non-magnetic support by repeating the above-described coating method followed by drying. Also, as the case may be, two or more layers may be simultaneously formed by the manner as described in West Germany Patent Application (DT-OS) Nos. 2,309,159, 2,309,158, etc.

The thickness of the magnetic layer is in the range of from about 0.5 to 12 μm in dry thickness. In the case of forming two or more layers, the thickness of the total layers is in the above-described range. Also, the dry thickness of the magnetic layer or layers is determined according to the use, the form, and the standard of the magnetic recording medium.

The magnetic layer formed by coating on the support is, if desired, subjected to the treatment for orienting the magnetic substance in the magnetic layer and then dried. Also, if desired, a surface smoothening treatment is applied to the surface of the magnetic layer. Then, the magnetic recording medium thus obtained is slit or cut into a desired form.

In particular, it has been found that when a surface smoothening treatment is applied to the surface of the magnetic layer in this invention, a magnetic recording medium having a smooth surface and excellent abrasion resistance is obtained. The surface smoothening treatment is performed by a smoothening treatment before drying the magnetic layer or a calendering treatment after drying the magnetic layer. Also, when the non-magnetic support is a film, a tape, a sheet, a card, etc., a so-called backcoat may be formed on the back surface of the support (opposite surface to the magnetic layer-carrying surface) for static prevention, the prevention of the transfer of unevenness of the back surface of the support onto the magnetic layer surface, the prevention of the occurrence of wow flutter, the improvement of the strength of the magnetic recording medium, matting of the back surface of the magnetic recording medium, etc.

The backcoat layer is formed by kneading at least one of the above-described additives such as the lubricant, the abrasion, the antistatic agent, etc., with the binder and the coating solvent described above and also, if desired, the dispersing agent for uniformly dispersing the aforesaid additives and coating the kneaded composition on the back surface of the support followed by drying.

The additives usually used for the backcoat layer are carbon black, graphite, talc, $Cr_2O_3$, $TiO_2$, $CaCO_3$, $FeO_x$ (wherein $X$ is 1.33 to 1.55), silicone oil, etc., and they may be used alone or in admixture. Also, in the above-described binders, the thermosetting resins and the reactive type resins are preferably used for the backcoat layer.

When the additive(s) are inorganic compound(s), they are used in an amount of from about 20 to 85% by weight and preferably from 30 to 80% by weight to the total solids content of the backcoat layer and when the additive(s) are organic compound(s), they are used in an amount of from about 0.1 to 30% by weight and preferably from 0.2 to 20% by weight. Also, the dry thickness of the backcoat layer is in the range of about 5.0 μm or less and is optionally selected in the range according to the total thickness, the use, the form, and the purpose of the magnetic recording medium.

In the magnetic recording medium of this invention, the dispersing time for the hexagonal tabular ferromagnetic substance is shortened and the degree of dispersion thereof is improved as well as the magnetic recording tape is excellent in output and C/N.

The invention is now further explained more specifically by the following example, wherein all "parts" are "by weight".

EXAMPLE

To Co-substituted barium ferrite (mean particle diameter: 0.07 μm, mean thickness: 0.025 μm, aspect ratio (diameter/thickness ratio) 2.8, coercive force: 850 Oe, bulk density: 0.55 g/cm$^3$, true density: 5.27 g/cm$^3$) was applied a compression treatment using a sand mill (type MPUV-5 h.p., made by Matsumoto Chuzo Tekko Sho K.K.). The compression treatment was performed at a linear pressure of 40 kg/cm, and the treatment time was 10 min., 20 min., 30 min., 40 min., and 60 min., respectively. The bulk density of the ferromagnetic substance was measured, and the results obtained are shown in Table 1. In addition, at the measurement of the bulk density, tapping was applied to each ferromagnetic substance for ensuring the measurement.

TABLE 1

| Treatment Time | Bulk Density | |
|---|---|---|
| | No Tapping (g/cm$^3$) | Tapping Applied (100 times) (g/cm$^3$) |
| 0 min. | 0.55 | 0.60 |
| 10 min. | 0.88 | 1.11 |
| 20 min. | 0.98 | 1.22 |
| 30 min. | 1.04 | 1.28 |
| 40 min. | 1.10 | 1.33 |
| 50 min. | 1.20 | 1.47 |

[Bulk Density Measuring Method]

(1) No Tapping Case:

In a 100 cc. measuring cylinder is placed 50 g of the compression treated magnetic substance, the column thereof is measured by the scale of the cylinder, and then the bulk density is calculated by the following equation:

$$\text{Bulk Density} = \frac{50 \text{ (g)}}{\text{Volume (cm}^3\text{)}}.$$

(2) Tapping Applied Case:

In a 100 cc. measuring cylinder is placed 50 g of the compression treated magnetic substance, tapping is applied thereto 100 times by tapping the magnetic substance with a tapping rod, the volume thereof is measured in each case, and the bulk density is calculated as above.

Then, 300 parts of each magnetic substance was kneaded together with 10 parts of a vinyl chloride-vinyl acetate-maleic anhydride copolymer (polymerization degree: 450), 36 parts of methyl ethyl ketone, and 36 parts of toluene for 60 minutes, and then 6 parts of a graphite powder, 4 parts of amyl stearate, 1.2 parts of lecithin, 5 parts of chromium oxide ($Cr_2O_3$), 50 parts of polyester polyol, 264 parts of methyl ethyl ketone, and 264 parts of toluene were added to the kneaded mixture. The resultant mixture was mixed until it became uniform and thereafter, it was dispersed by mixing using a sand mill. At the start of the dispersion by the sand mill or after 1 hour, 3 hours, 5 hours, 10 hours, or 15 hours from the start of the dispersion, each dispersion was coated on a polyester support of 5 inches in width and 20 μm in thickness by hand using a 2 mil blade, and the gloss of the coated layer was measured to determine the progressing state of dispersion. The results are shown in Table 2 and the FIGURE.

TABLE 2

| Bulk Density (g/cm$^3$) | B/T* | Gloss After Dispersion by Sand Mill | | | | | |
|---|---|---|---|---|---|---|---|
| | | 0 hr. | 1 hr. | 3 hrs. | 5 hrs. | 10 hrs. | 15 hrs. |
| 0.55 | 0.10 | 80 | 90 | 103 | 108 | 118 | 125 |
| 0.88 | 0.17 | 83 | 108 | 110 | 113 | 123 | 126 |
| 0.98 | 0.19 | 76 | 115 | 115 | 117 | 125 | 127 |
| 1.04 | 0.20 | 65 | 121 | 119 | 121 | 126 | 128 |
| 1.10 | 0.21 | 90 | 129 | 124 | 124 | 129 | 130 |
| 1.20 | 0.23 | 50 | 135 | 133 | 131 | 134 | 133 |

*B: Bulk Density, T: True Density

[Gloss Measurement Method JIS Z8741]

The gloss thereof was measured at an incident angle of 45° with the specular gloss of the surface of a glass having a refractive index of 1.567 at the aforesaid angle of incidence being 100%.

The FIGURE is a graph showing the relation of the dispersing time by a sand mill and the gloss for ferromagnetic substances having a different bulk density/true density value.

Next, to each of a total of eight kinds of magnetic compositions, i.e, 6 kinds of magnetic compositions prepared by dispersing each of the ferromagnetic substances without being subjected to the compression treatment for 15 hours by a sand mill and 2 kinds of the magnetic compositions prepared by dispersing each of the ferromagnetic substances, which were subjected to the compression treatment for 40 minutes and 60 minutes respectively, for one hour by a sand mill, was added 30 parts of polyisocyanate and the resultant mixture was dispersed again by a sand mill to provide each hardenable magnetic coating composition. Each of these coating compositions was coated on a polyethylene terephthalate film of 15 μm in thickness subjected to a corona discharging treatment at a dry thickness of 5

μm using a gravure roll and dried to provide Sample Nos. 1 to 8.

Each of these samples was slit into ½ inch widths, the tape thus formed was travelled by VIR J-20 made by Sony Corporation at a half driving speed, a wavelength of 5.8 MHz was recorded on each sample at each optimum recording electric current by means of a commercially available ferrite head, and the output was measured. The measured value was a relative value to the VHS regular tape made by Fuji Photo Film Co., Ltd.

Also, a wavelength of 4.5 MHz was recorded thereon at each optimum recording electric current and from the difference between the output thereof and the modulation noise at 3.5 MHz, C/N was measured.

These results are shown in Table 3 below.

TABLE 3

| Sample No. | Bulk Density | B/T* | Dispersing Time | Relative Output | C/N |
|---|---|---|---|---|---|
| 1 | 0.55 | 0.10 | 15 hrs. | +9.8 dB | +47.2 dB |
| 2 | 0.88 | 0.17 | 15 hrs. | +10.4 dB | +47.9 dB |
| 3 | 0.98 | 0.19 | 15 hrs. | +10.4 dB | +48.0 dB |
| 4 | 1.04 | 0.20 | 15 hrs. | +10.6 dB | +48.0 dB |
| 5 | 1.10 | 0.21 | 15 hrs. | +11.2 dB | +48.1 dB |
| 6 | 1.20 | 0.23 | 15 hrs. | +12.0 dB | +48.2 dB |
| 7 | 1.10 | 0.21 | 1 hr. | +11.2 dB | +48.1 dB |
| 8 | 1.20 | 0.23 | 1 hr. | +12.2 dB | +48.2 dB |

*B: Bulk Density, T: True Density

From the results shown above, it can be seen that in the case of applying the compression treatment to a hexagonal tabular ferromagnetic substance according to this invention, the degree of dispersion thereof is improved, the dispersing time for the ferromagnetic substance can be shortened, and the desired output and C/N can be obtained in a very shortened period of dispersion for the ferromagnetic substance.

While the invention has beeen described in detail and with reference to specific embodiments thereof, it will be apparent to one skilled in the art that various changes and modifications can be made therein without departing from the spirit and scope thereof.

What is claimed is:

1. A magnetic recording medium having on a non-magnetic support a magnetic layer comprising a ferromagnetic substance dispersed in a binder, wherein said ferromagnetic substance is a hexagonal tabular ferromagnetic substance having an axis of easy magnetization in the direction perpendicular to the plane thereof and the ratio of the bulk density to true density is at least 0.16.

2. A magnetic recording medium as claimed in claim 1, wherein the ratio of the bulk density to the true density of the ferromagnetic substance is increased to at least 0.16 by applying a compression treatment onto the ferromagnetic substance.

3. A magnetic recording medium as claimed in claim 2, wherein the compression treatment is applied at a linear pressure of from 5 to 150 kg/cm for from 5 minutes to 10 hours.

4. A magnetic recording medium as claimed in claim 1, wherein the ferromagnetic substance is Co-substituted barium ferrite.

5. A magnetic recording medium as claimed in claim 1, wherein the ferromagnetic substance is Co-substituted strontium ferrite.

6. A magnetic recording medium as claimed in claim 1, wherein the hexagonal tabular ferromagnetic substance is a tabular hexagonal ferrite.

7. A magnetic recording medium as claimed in claim 1, wherein the hexagonal tabular ferromagnetic substance is selected from the group consisting of barium ferrite, strontium ferrite, lead ferrite, calcium ferrite, a manganese-bismuth alloy and a hexagonal cobalt alloy.

8. A magnetic recording medium as claimed in claim 1, wherein the ratio of the bulk density to true density is 0.67 to 0.16.

9. A magnetic recording medium as claimed in claim 1, wherein the ratio of the bulk density to true density is 0.20 to 0.50.

* * * * *